United States Patent [19]

Rouillot

[11] Patent Number: 5,474,630
[45] Date of Patent: Dec. 12, 1995

[54] PROCESS FOR MANUFACTURING A TRANSMISSION SHAFT MADE OF A COMPOSITE MATERIAL AND SHAFT MANUFACTURED ACCORDING TO THE PROCESS

[75] Inventor: Michel Rouillot, St Germain en Laye, France

[73] Assignee: GKN Glaenzer Spicer, Carrieres-Sous-Poissy, France

[21] Appl. No.: 426,485

[22] Filed: Apr. 20, 1995

Related U.S. Application Data

[63] Continuation of Ser. No. 147,917, Nov. 4, 1993, abandoned, which is a continuation of Ser. No. 785,455, Oct. 3, 1991, abandoned.

[51] Int. Cl.$^6$ ............... B29C 63/18; B32B 1/10; F16C 3/02
[52] U.S. Cl. ............... 156/49; 156/86; 264/230; 264/257; 464/181; 464/903
[58] Field of Search ............... 156/148, 149, 156/86, 172; 264/230, 257, 258, 313; 464/181, 183, 903, 902

[56] References Cited

U.S. PATENT DOCUMENTS

| 1,972,756 | 9/1934 | Blaisdell | 156/149 |
|---|---|---|---|
| 3,253,618 | 5/1966 | Cook | 156/149 |
| 3,655,858 | 4/1972 | Wincklhofer | 264/230 |
| 3,669,157 | 6/1972 | Woodall, Jr. et al. | |
| 4,171,626 | 10/1979 | Yates | 464/181 |
| 4,173,670 | 11/1979 | Van Auken | 464/183 |
| 4,248,062 | 2/1981 | McClain | 464/181 |
| 4,462,946 | 7/1984 | Goldsworthy | 264/230 |
| 4,652,171 | 3/1987 | Schutze | 403/403 |
| 4,758,458 | 7/1988 | Schutze | |
| 4,774,043 | 9/1988 | Beckmann | 264/134 |
| 4,888,224 | 12/1989 | Zackrisson | 464/181 |
| 5,076,871 | 12/1991 | Frye | 156/86 |

FOREIGN PATENT DOCUMENTS

| 0115763 | 1/1984 | European Pat. Off. . |
|---|---|---|
| 2582254 | 11/1986 | France . |
| 2089761 | 6/1982 | United Kingdom . |

OTHER PUBLICATIONS

Database WPI, No. 79–80054B (44), English Abstract of Japanese reference 54–123175 filed Sep. 25, 1979.
Patent Abstracts of Japan, vol. 8, No. 148 (M–308), English abstract of Japanese reference 155712 filed Sep. 7, 1982.

*Primary Examiner*—Jeff H. Aftergut
*Assistant Examiner*—Daniel J. Stemmer
*Attorney, Agent, or Firm*—Harness, Dickey & Pierce

[57] ABSTRACT

The invention proposes a process for manufacturing a transmission shaft made of a composite material comprising at least one step for producing an external layer comprising reinforcing fibers impregnated with a heat-curable resin, characterized in that a peripheral sheath made of a knitted article is installed over the external layer prior to the curing of the resin during the polymerization cycle.

13 Claims, No Drawings

PROCESS FOR MANUFACTURING A TRANSMISSION SHAFT MADE OF A COMPOSITE MATERIAL AND SHAFT MANUFACTURED ACCORDING TO THE PROCESS

This is a continuation of U.S. patent application Ser. No. 08/147,917 filed Nov. 4, 1993, now abandoned, which is a continuation of Ser. No. 07/785,455 filed Oct. 31, 1991, now abandoned.

The present invention relates to a process for manufacturing a transmission shaft made of a composite material, of the type comprising at least one step for producing an external layer comprising reinforcing fibres impregnated with a heat-curable resin.

Various manufacturing processes of this type are known enabling, especially, the production of tubular transmission shafts used, for example, in the automobile industry.

It has proved desirable for the condition of the outer surface of a transmission shaft manufactured according to such a process to be as uniform as possible, on the one hand to impart an aesthetic appearance to the shaft, and on the other hand so as to improve its resistance to ageing, in particular to the phenomenon called wet ageing, by forming a substantially continuous resin layer thereon. It is also desirable to be able to remove excess impregnation resin.

So as to achieve these objectives, the invention proposes a manufacturing process of the type mentioned hereinabove, characterised in that a peripheral sheath made of a knitted article is installed over the external layer prior to the curing of the resin during the thermal polymerisation cycle.

According to other characteristics of the invention:

the sheath is knitted using thermoplastic thread possessing an ability to shrink when it is subjected to a temperature variation corresponding substantially to the variation in the temperature of the resin in the course of the thermal polymerisation cycle;

an axial tensile force is maintained on the sheath in such a manner as to cause the sheath to shrink radially around an external layer;

the sheath made of a knitted article is elastically deformed in order to increase its diameter prior to its installation over the external layer;

the installation step comprises a circular knitting of the sheath around the external layer of the transmission shaft.

In the case where a tubular transmission shaft is produced, the step for producing the external layer consists especially of laying impregnated reinforcing fibres over a core of circular cross-section.

The subject of the invention is also a transmission shaft, especially a tubular transmission shaft, manufactured in accordance with the process.

A tubular transmission shaft made of a synthetic resin reinforced with fibres may be manufactured according to various known processes in which at least one layer is produced with reinforcing fibres, for example carbon fibres, impregnated with a curable synthetic resin which are, for example, wound at a predetermined winding angle around a winding mandrel or core, the assembly then being cured under the effect of heat by heating to a relatively high temperature, for example between 80° and 150° C. This heating step is then followed by cooling the assembly down to ambient temperature.

The invention proposes to complete such a manufacturing process by installing a peripheral sheath made of a knitted article over the external layer thus produced, prior to the operation for curing the resin.

By knitted article, in the sense of the invention, is meant a part manufactured by means of a single thread intertwined on itself, or of several threads intertwined together according to the technique used in the knitting industry in which the threads are folded back over themselves in the form of regular loops, the latter being attached to each other and being called stitches.

By the expression stitches is thus denoted a loop of thread generally having the form of two S shapes placed symmetrically, this form being maintained with the aid of other loops attached to the four curves of the thread.

Since the thread is not arranged in a straight line in the stitches, but is curved a large number of times, this assembly of stitches (also called knitted fabric) is easily stretched in all directions, the elasticity of the thread tending to cause it to return to its original shape and making the item of knitting thus produced elastic.

The elasticity is the most important characteristic of the knitted fabric or knitted article.

The invention therefore proposes to use a sheath, for example circularly woven, which is akin to the articles made of knitted fabric used in the clothing field such as socks and stockings.

The invention proposes to use a knitted sheath made of a thermoplastic thread, such as, for example, a polyamide thread, which is chosen so as to have an ability to shrink when it is subjected to a temperature which is in the range of temperatures corresponding to the temperatures of the resin during the polymerisation cycle.

This characteristic makes it possible to combine, during the installation of the sheath over the external layer, the "elasticity" effects due to its knitted-fabric structure and due to the thermal shrinkage phenomenon of the thermoplastic material constituting the thread so as to obtain a radial pressure effect over the external layer made of resin-impregnated fibres in such a manner as to cause the resin to impregnate the sheath and the resin to pass through the sheath, at least partially, in order to obtain a continuous external layer of resin on the outside of the transmission tube and in order to cause any excess resin to be removed towards the outside.

In order to increase the radial pressure effect, it is possible to maintain an axial tensile force on the sheath during the polymerisation cycle in such a manner as to oppose the axial shrinkage effect of the sheath thereby forcing the latter to shrink radially, that is to say to reduce in diameter in order to compress the external layer.

According to a variant it is initially possible to deform the knitted sheath elastically in the radial direction in order to increase the diameter thereof, before its installation over the external layer, and thus to benefit even more from the radial pressure effect on the external layer.

The knitted sheath may be produced, with or without sewing, prior to its installation over the external layer or may, by way of variation, be circularly knitted in situ around the external layer of the transmission shaft with the aid of a circular knitting machine through which the transmission shaft passes.

In the case where the sheath is knitted prior to its installation, it is possible to install it over the external sheath by conveying it with the aid of an outer tube which is coaxial with the transmission shaft and of larger diameter or with the aid of a linear displacement handling device.

The process according to the invention makes it possible to produce transmission shafts having a solid composite structure or tubular transmission shafts which, in both cases, have an outer surface possessing the required surface condition qualities.

The thread constituting the sheath is preferably chosen in such a manner that the shrinkage effect occurs at the temperature at which the resin is most fluid, that is to say during the first part, called gelling part, of the polymerisation cycle.

The process is not limited to the manufacture of cylindrical shafts having uniform circular cross-section, but is also applicable to shafts having a non-circular cross-section which can vary over its length.

I claim:

1. A process for manufacturing a transmission shaft made of a composite material comprising:

producing a layer comprising reinforcing fibers impregnated with a heat-curable resin; installing a peripheral sheath over the layer of resin-impregnated reinforcing fibers prior to curing of the resin, the peripheral sheath being a stretchable knitted article composed of intertwined loops of thread, the knitted construction of said sheath providing said sheath with elastic and stretchable characteristics, the thread being of a material that has an ability to shrink when subjected to a temperature within the polymerization temperature range of the resin; and bringing the assembly of said layer of resin-impregnated reinforcing fibers and of the peripheral sheath to a temperature within the polymerization temperature range of said resin, whereby said resin impregnates said sheath and at least partially passes through said sheath due to the radial pressure effect produced by the elasticity and shrinking of said sheath, said resin defining a continuous external resin layer, said resin being cured and said sheath and said external resin layer being maintained after said resin is cured so that said sheath and said external resin layer constitute the outermost layers of said shaft.

2. The process according to claim 1, including the further step of deforming said sheath elastically in the radial direction in order to increase its diameter prior to the installation of said sheath over said reinforcing fibers and maintaining an axial tensile force on the sheath during polymerization.

3. Manufacturing process according to claim 1, wherein said sheath made of a knitted article is elastically deformed in order to increase its diameter prior to its installation over said resin-impregnated reinforcing fibers.

4. Manufacturing process according to claim 1, wherein said step for installing the sheath comprises a step for circular knitting of the sheath around said resin-impregnated reinforcing fibers of the transmission shaft.

5. Method for manufacturing a tubular transmission shaft according to claim 1 wherein said step for producing the layer of resin-impregnated reinforcing fibers includes laying impregnated reinforcing fibers over a core.

6. A process for manufacturing a transmission shaft made of a composite material comprising: producing a layer comprising reinforcing fibers impregnated with a heat-curable resin; installing a peripheral sheath over the layer of resin-impregnated reinforcing fibers prior to curing of the resin, the peripheral sheath being a stretchable knitted article composed of intertwined loops of thread, the knitted construction of said sheath providing said sheath with elastic and stretchable characteristics, the thread being of a material that has an ability to shrink when subjected to a temperature within the polymerization temperature range of the resin;

deforming said sheath elastically in the radial direction in order to increase its diameter prior to the installation of said sheath over said reinforcing fibers and maintaining an axial tensile force on the sheath during polymerization; and bringing the assembly of said layer of resin-impregnated reinforcing fibers and of the peripheral sheath to a temperature within the polymerization temperature range of said resin, whereby said resin impregnates said sheath and at least partially passes through said sheath due to the radial pressure effect produced by the elasticity and shrinking of said sheath, said resin defining a continuous external resin layer, said resin being cured and said sheath and said external resin layer being maintained after said resin is cured so that said sheath and said external resin layer constitute the outermost layers of said shaft.

7. A process for applying an external finishing layer to a transmission shaft core thereby completing its manufacture, said process comprising the steps of:

winding reinforcing fibers around the transmission shaft core;

impregnating said reinforcing fibers with a heat-curable resin;

overwrapping said resin-impregnated reinforcing fibers with a peripheral sheath, said peripheral sheath being a resilient stretchable knitted article composed of intertwined loops of heat-shrinkable elastic thread, the knitted construction of said sheath providing said sheath with elastic and stretchable characteristics; and curing said resin by subjecting said core to a temperature sufficient to effect polymerization of said resin;

wherein said peripheral sheath has sufficient resiliency and heat-shrink sensitivity so that said resin impregnates said sheath and at least partially passes through said sheath due to the radial pressure effect produced by the elasticity and shrinking of said sheath during polymerization, said resin defining a continuous external resin layer.

8. The process for applying an external layer to a transmission shaft core of claim 7 further including the step of elastically deforming said peripheral sheath to increase its diameter prior to the step of overwrapping said sheath on said resin-impregnated reinforcing fibers.

9. The process for applying an external layer to a transmission shaft core of claim 7 wherein said temperature sufficient to effect polymerization is within the range of 80 degrees celsius and 150 degrees celsius.

10. The process for applying an external layer to a transmission shaft core of claim 7 wherein said step of winding reinforcing fibers includes the winding of said fibers at a predetermined winding angle.

11. The process for applying an external layer to a transmission shaft core of claim 7 wherein said shaft has a circular cross-section.

12. The process for applying an external layer to a transmission shaft core of claim 7 wherein said thread of said peripheral sheath is composed of a polyamide polymer.

13. The process according to claim 12, including the further step of deforming said sheath elastically in the radial direction in order to increase its diameter prior to the installation of said sheath over said reinforcing fibers and maintaining an axial tensile force on the sheath during polymerization.

* * * * *

UNITED STATES PATENT AND TRADEMARK OFFICE
CERTIFICATE OF CORRECTION

PATENT NO. : 5,474,630
DATED : December 12, 1995
INVENTOR(S) : Michel Rouillot

It is certified that error appears in the above-indentified patent and that said Letters Patent is hereby corrected as shown below:

On the Title page, item [63]

Under Related U.S. Application Data:

With reference to the date of Application Serial No. 785,455, "Oct. 3, 1991" should be --Oct. 31, 1991--.

Signed and Sealed this

Eleventh Day of June, 1996

Attest:

BRUCE LEHMAN

*Attesting Officer*  *Commissioner of Patents and Trademarks*